G. H. REMINGTON & J. P. MANTON,

Assignors to the AMERICAN SHIP WINDLASS CO.

Locking-Gear for Windlass.

No. 8,524. Reissued Dec. 17, 1878.

WITNESSES:

Joseph A. Miller Jr.

William L. Cooper

INVENTOR:

George H. Remington

Joseph P. Manton by Joseph A. Miller attorney

N. PETERS, PHOTO-LITHOGRAPHER, WASHINGTON, D. C.

UNITED STATES PATENT OFFICE.

GEORGE H. REMINGTON AND JOSEPH P. MANTON, OF PROVIDENCE, RHODE ISLAND, ASSIGNORS TO THE AMERICAN SHIP WINDLASS COMPANY.

IMPROVEMENT IN LOCKING-GEAR FOR WINDLASSES.

Specification forming part of Letters Patent No. 174,977, dated March 21, 1876; Reissue No. 8,524, dated December 17, 1878; application filed September 9, 1878.

*To all whom it may concern:*

Be it known that we, GEORGE H. REMINGTON and JOSEPH P. MANTON, both of the city and county of Providence, State of Rhode Island, have invented new and useful Improvements in Locking-Gear for Windlasses; and we do hereby declare that the following is a clear, full, and exact description of the same, which will enable others skilled in the art to make and use the same, reference being had to the accompanying drawing, forming part of this specification.

Figure 2:
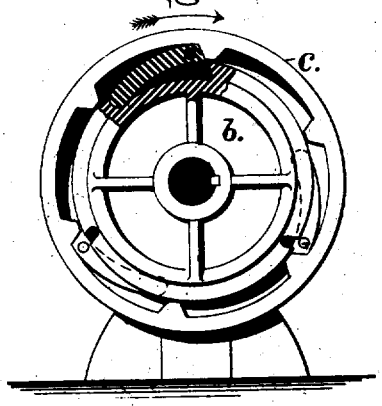
Figure 1:
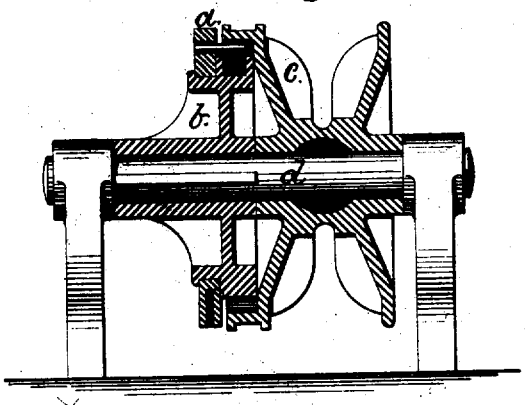
Figure 4:
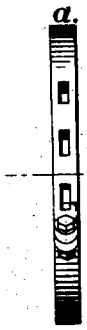
Figure 3:
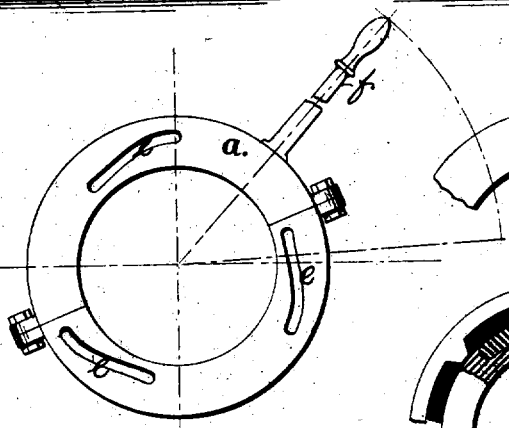
Figure 5:
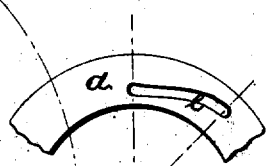
Figure 6:
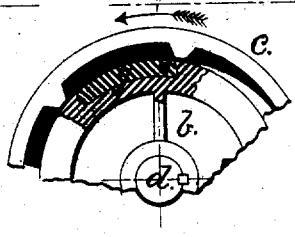
Figure 7:
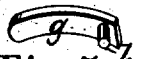

Figure 1 is a longitudinal section through the center of the wild-cat and driving-head. Fig. 2 is an end view of the locking device, partly in section. Fig. 3 is a front view of the locking-ring. Fig. 4 is a side view of the locking-ring. Fig. 5 shows a section of the locking-ring in an unlocked position. Fig. 6 shows a partial end view, also partly in section, showing the wild-cat unlocked from the windlass-head. Fig. 7 shows the locking-pawl.

Similar letters of reference indicate corresponding parts.

This invention relates to a new method for connecting and disconnecting the several parts of a capstan or windlass, so that they may be connected to revolve with the shaft or be free to revolve without reference to the shaft or other part of the capstan or windlass.

It consists in the application of a ring having two or more grooves or slots, into which a pin secured to the locking-pawl enters, so that by turning the ring on the windlass or capstan-head the locking-pawls are either raised and brought in contact with the part to be locked or depressed, and thus relieve the pawls, and allow the part to turn freely on the shaft.

In the drawings, *a* is the ring, which is shown made in two parts. *b* is the windlass-head secured to the shaft. On this head the ring is supported, and on it the same may be turned. *c* is the chain-wheel or wild-cat, turning loose on the shaft. The projecting rim of the wild-cat for receiving the band of the friction-brake has ratchet-shaped thrust-blocks cast on its inner side, against which the pawls bear when the wild-cat is secured to the windlass-head, and is thus locked to the same and will turn with the shaft, as is shown in Fig. 2.

*d* is the main shaft, to which power is applied, and to which the windlass-head *b* is secured, while the wild-cat is loose on the same, and may turn freely in paying out, being controlled by the friction-brake. *e e* are the curved slots in the locking-ring, in which the pins secured to the pawls slide. These slots are made so that when the locking-ring turns in one direction the pawls will be raised or moved farther from the center, and if turned in the opposite direction the pawls will be released and brought nearer the center, as shown in Fig. 6.

In the drawings, three slots, *e e e*, are shown, curved in the same direction. Instead of this arrangement, four slots may be made in the ring, two curved in one and two in the opposite direction. The locking-ring *a* may then be placed on two loose parts of a capstan or windlass, so that when the locking-ring is turned in one direction one part is locked to and the other part released from the capstan or windlass-head, and when turned in the opposite direction the reverse is the result.

When the locking-ring is turned in either direction, one part is locked to and the other released from the windlass-head and main driving-shaft.

*f* is a hand-spike, inserted, when used, into socket-holes provided in the periphery of the locking-ring *a*, and by which the ring is turned and the parts locked or unlocked. *g* is one of the pawls, and *h* the pin entering the slot *e*.

The operation is as follows: The shaft *d* turning in the direction of the arrow in Fig. 2 to secure the wild-cat to the windlass-head, the locking-ring *a* is turned in the opposite direction, and the pin *h* pasing in the slot *e*, and secured to one end of the pawl *g*, the latter is raised, and engages with the abutment of the wild-cat, as shown in Fig. 2.

When, on the contrary, the wild-cat is to be released, the ring *a* is turned in the opposite direction, and the pawl returns to its recess, as is shown in Fig. 6.

Having thus described our invention, we claim as new and desire to secure by Letters Patent—

1. In a windlass, the combination, with a wild-cat loosely mounted on the shaft, of a driving-head rigidly secured to the shaft, and one or more locking-blocks, adapted and arranged to lock the wild-cat to the driving-head by moving the block or blocks outwardly from the shaft, and to disconnect such parts by moving the block or blocks toward the shaft, substantially as set forth.

2. In a windlass, the combination, with a wild-cat loosely mounted on the shaft and a driving-head rigidly secured to said shaft, of one or more locking-blocks, adapted to be moved toward and from the shaft, and a ring connected with said locking block or blocks, whereby a part revolution of said ring will operate to move said block or blocks toward or from the shaft, and connect or disconnect the wild-cat and driving-head, substantially as set forth.

3. In a windlass, the combination, with a wild-cat loosely mounted on the shaft and a driving-head rigidly secured to said shaft, of one or more locking-blocks, located between the periphery of the driving-head and inner periphery of a flange on the wild-cat, and a ring having sockets formed in its periphery, said ring constructed and arranged to move said block or blocks toward or from the shaft, and connect or disconnect the wild-cat and driving-shaft, substantially as set forth.

4. In a windlass, the combination, with a wild-cat loosely mounted on the shaft and a driving-head rigidly secured to said shaft, of one or more locking-blocks, and a ring provided with eccentric or tangential slots for the reception of the locking-block pins, substantially as set forth.

5. In a windlass, the combination, with a wild-cat loosely mounted on the shaft, said wild-cat constructed with an outwardly-projecting flange provided with locking-block recesses on its inner surface, and a driving-head rigidly secured to the shaft, the periphery of said driving-head formed with locking-block recesses, which latter are in vertical plane with the recesses in the flange of the wild-cat, and a ring mounted on the driving-head and connected with the locking block or blocks, whereby said ring, being partially rotated, operates to move the locking-blocks toward or from the shaft, and connect or disconnect the wild-cat and driving-head, substantially as set forth.

GEO. H. REMINGTON.
JOS. P. MANTON.

Witnesses:
JOSEPH A. MILLER,
JOSEPH A. MILLER, Jr.